Dec. 14, 1971  W. L. SIDES  3,626,677
MECHANICAL HARVESTER

Filed Oct. 14, 1969  7 Sheets-Sheet 1

Fig. 1

Wilmot L. Sides
INVENTOR.

BY McDougall, Hersh,
Scoffield Ladd
Attorneys

United States Patent Office 3,626,677
Patented Dec. 14, 1971

3,626,677
MECHANICAL HARVESTER
Wilmot L. Sides, Rte. 2, Box 42,
Goldthwaite, Tex. 76844
Filed Oct. 14, 1969, Ser. No. 866,257
Int. Cl. A01d 51/00
U.S. Cl. 56—328
39 Claims

ABSTRACT OF THE DISCLOSURE

A ground traveling harvester for nuts and the like comprising a full width pickup unit including an elongated drum mounting pickup fingers, and an overlying adjustable hood which cooperates with the fingers in the raising and rearward discharging of the nuts. The raised nuts are deposited on an upwardly and rearwardly traveling chain belt. A second chain belt travels under the lower portion of the first chain belt and retains the nuts for traveling movement by the first chain belt while allowing trash and the like to drop therethrough for discharge on the ground. Continued travel of the first chain belt beyond the second chain belt results in a dropping of the gathered nuts through the first chain belt onto a panel which directs the nuts to a cross conveyor. A trash dislodging fan discharges through the second portion of the first chain belt. The conveyor feeds the nuts to one end of a rotating screen drum for a more complete separation of the trash from the nuts. Subsequent to a travel of the nuts through the screen drum, the nuts are elevated by a rotating elevator for deposit in an outlet spout or chute which effects a lateral discharge of the cleaned nuts from the machine.

The instant invention generally relates to a fruit harvesting machine, and is more particularly directed to a harvester for harvesting fallen nuts, for example pecans.

It is a primary object of the instant invention to provide a machine for harvesting nuts in an efficient and non-damaging manner, and subsequently, as a continuing operation, subject the nuts to several cleaning operations with the nuts ultimately being discharged from the machine into a collection unit in a clean and undamaged condition.

Another significant object of the instant invention resides in the provision of a machine which, notwithstanding the highly unique and efficient total operation thereof, is compact, incorporates a high degree of maneuverability, utilizes the full width of the machine, performs with a minimum amount of moving parts and has a relatively low profile for movement under and about low trees.

The advantages achieved by the instant invention are a result of a unique combination of components mounted on a highly mobile self-propelled chassis. The chassis includes two forward drive wheels and one rear steering wheel with a rotary ground engaging broom mounted forward of one or both wheels so as to effect a laterally inward directing of the nuts into the path of the pickup unit and out of the path of the wheels. The pickup unit, through a plurality of flexible gathering fingers and an adjustable overlying hood, upwardly gathers the nuts for deposit on a traveling chain-like first conveyor having a second conveyor underlying an initial portion thereof which permits dirt particles of small dimension to filter therethrough while blocking passage of nuts of larger dimension. As the first conveyor moves beyond the second conveyor, the nuts are free to fall therethrough onto a gathering plate, while at the same time being subjected to an upward forced flow of air so as to effect a further separation of trash therefrom. The plate received nuts are directed to a cross conveyor which subsequently introduces the nuts into a rotating separating screen drum along which the nuts travel and are subjected to a further cleaning action. The nuts are subsequently discharged from the screen drum into an elevating unit which raises the nuts to a laterally directed discharge chute, thereby completing the harvesting and cleaning operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now more specifically to the drawings, reference numeral 20 is used to generally designate the harvesting machine comprising the instant invention. The machine 20 includes a self-propelled chassis 22 mounting laterally spaced front drive wheels 24 and a centrally positioned rear steering wheel 26. The power plant 28 and the operator's seat 30 immediately adjacent thereto are mounted over the front axle, at the forward end of the machine. As will be appreciated, the operator is thus provided with a clear and unencumbered view of the area being traversed, the power plant being located so as to not interfere with the utilization of the entire width of the machine 20 for the gathering and cleaning functions.

In order to avoid a crushing or damaging of the nuts by the laterally located drive wheels 24, and at the same time insure a full gathering of the nuts, a rotary broom 32 is mounted immediately forward of at least one, and preferably both of the wheels 24. The broom 32 consists of a disc or plate 34 angled forwardly and laterally outwardly with a plurality of elongated flexible rubber-like fingers 36 peripherally secured thereto and depending therefrom for a sequential engagement with the ground and an inward sweeping of the encountered nuts. The disc 34 is mounted on and driven by an appropriate hydraulic motor 38 which is in turn pivotally mounted on the forward portion of the frame of the machine 20 by parallel links 40. A floating action is provided for the broom 32 by means of an elongated coiled tension spring 42 engaged between the lower one of the links 40 and a rigid part 44 mounted on the machine frame in special relation thereabove. The flexing fingers, which, as one example, can be made of ⅜ inch hydraulic hose with wire braid, insures a proper non-damaging inward movement of the encountered nuts away from the adjacent wheel 24, with the fingers and floating action of the broom 32 itself closely following the contours of the covered land and providing a clean sweep thereof.

The pickup unit 46 extends transversely across the machine 20 immediately to the rear of the front wheels 24. The pickup unit 46 includes an elongated hollow cylindrical drum 48 from which picking fingers 50, normally arranged in full length rows, project for a sequential engagement with the ground in a nut gathering manner. These fingers 50 are similar to the broom fingers 36 and, while possessing sufficient rigidity so as to insure a proper nut picking operation, are likewise capable of sufficient flexing so as to avoid damage to the nuts. The drum 48 is mounted by means of a coaxially extending shaft 52 fixed to opposed end plates on the drum 48 and projecting therebeyond for rotatable retention within a pair of pillow blocks 54. The two outwardly located pillow blocks 54 are mounted on a pair of side beams 56, the rear ends of which are pivoted to the chassis as at 58, and the forward ends of which are interconnected by a transversely extending beam 60. An elongated coiled tension spring 62 if fixed to the cross beam 60 centrally thereof and adjustably to an overhead member 64 rigid with the chassis whereby a spring loaded floating of the pickup unit 46 is provided for, this in turn greatly facilitating and enhancing the picking operation through the ability of the pickup unit to conform and adjust to variations in the ground level. This feature, in combination with the flexible nature of the fingers, actually enabling a positive picking of the nuts from ground holes, cow tracks, and the like as well as about small stumps and rocks.

In order to provide means for manually raising and lowering the pickup unit 46 to accommodate particular circumstances, an upright rigid member 66 is affixed to and projects upwardly from each pivotally mounted side beam 56 forward of the drum-shaft 52, the upper ends of the uprights 66 being rigidly interconnected by a transverse beam 68 which is in turn provided with a forwardly projecting handle 70 oriented for easy access thereto by a seated operator. Thus, the operator, as required, can raise or lower the pickup unit through a manipulation of the adjacent handle 70.

An arcuate nut guiding hood 72 is provided about the forward portion of the drum 48, just outward of the tips of the fingers 50 and inward of the transverse beams 60 and 68, for cooperation with the fingers in the elevating and guiding of the nuts to the cleaning apparatus. The upper edge of the hood 72 is rigidified by a beam-like member 74 affixed longitudinally therealong, the lower edge of the hood 72 mounts one edge of an elongated ground engaging flexible strip 76, the other edge of which is mounted to a member 78 rigid with the chassis forward of the hood. The flexible strip 76 is of a length equal to that of the drum 48 and is of a width so as to fold with the central portion thereof in sliding engagement with the ground in a manner so as to constitute no obstruction to material passing thereunder, while at the same time forming a ground engaging continuation of the lower portion of the hood 72 whereby the nuts will be properly moved upwardly thereover and not be lost by a forward escaping thereof beneath the hood. For this purpose, the lower edge of the hood terminates a short distance above normal ground level to enable use over uneven terrain. The distance between the lower edge of the hood and the ground is made up by the flexible strip 76 secured along one edge to the lower edge of the drum and along the other edge to the lower edge of the rigid member 78 spaced forwardly of the hood and terminating at a level preferably higher than the lower edge of the hood. The strip is dimensioned to have a width greater than the spaced relation between the lower edge of the hood 72 and the rigid member 78 so as to provide a downwardly extending arcuate portion which is adapted to ride over the ground surface notwithstanding changes in the distance between the lower edge of the hood and the ground. This flexible extension for the lower edge of the hood is desirable to maximize the effect of the fingered drum for displacement of the nuts from the ground into the hood.

The actual mounting of the hood 72, which is done in a manner so as to enable a slight rotational adjustment of the hood about the drum 48 for varying the width of the inlet and outlet ends thereof as might be required to obtain the optimum nut pickup and discharge, is effected by utilizing a pair of laterally spaced elongated rigid arcuate straps 80. Each of the straps 80 has the upper and lower end portions thereof welded or otherwise rigidly affixed to the two transverse beams 60 and 68. The outer surface of the hood 72 seats against these straps 80 with the hood 72 being rigidly clamped thereagainst by upper and lower transverse mounting straps 82. These straps 82 span the straps 80 and are directly bolted to the hood 72 to the opposite side thereof. Thus, when an adjustment of the hood 72 is desired, the bolts securing the straps 82 are loosened and the hood 72 slid to an adjusted position after which the bolts are again tightened, thereby again rigidly fixing the position of the hood 72. It will be appreciated that the bottom engaging flap 76 will be of a width so as to maintain a proper sealing engagement with the ground throughout the adjusted positions of the hood 72.

The hood 72 additionally includes arcuate sides or side plates 84 which extend inwardly from the opposite edges of the hood 72 and overlie the forward portion of the ends of the drum 48 so as to in effect provide a confining chamber within which the picking or gathering fingers 50 operate in elevating the nuts, this preventing an accidental lateral discharge of the nuts. While not illustrated, if so desired, a flexible skirt can be suspended from the lower edge of each side wall 84 so as to move along the ground in a manner so as to confine the nuts therein and avoid any accidental lateral loss of the nuts at the time of initial engagement by the picking fingers 50.

Figure 4:
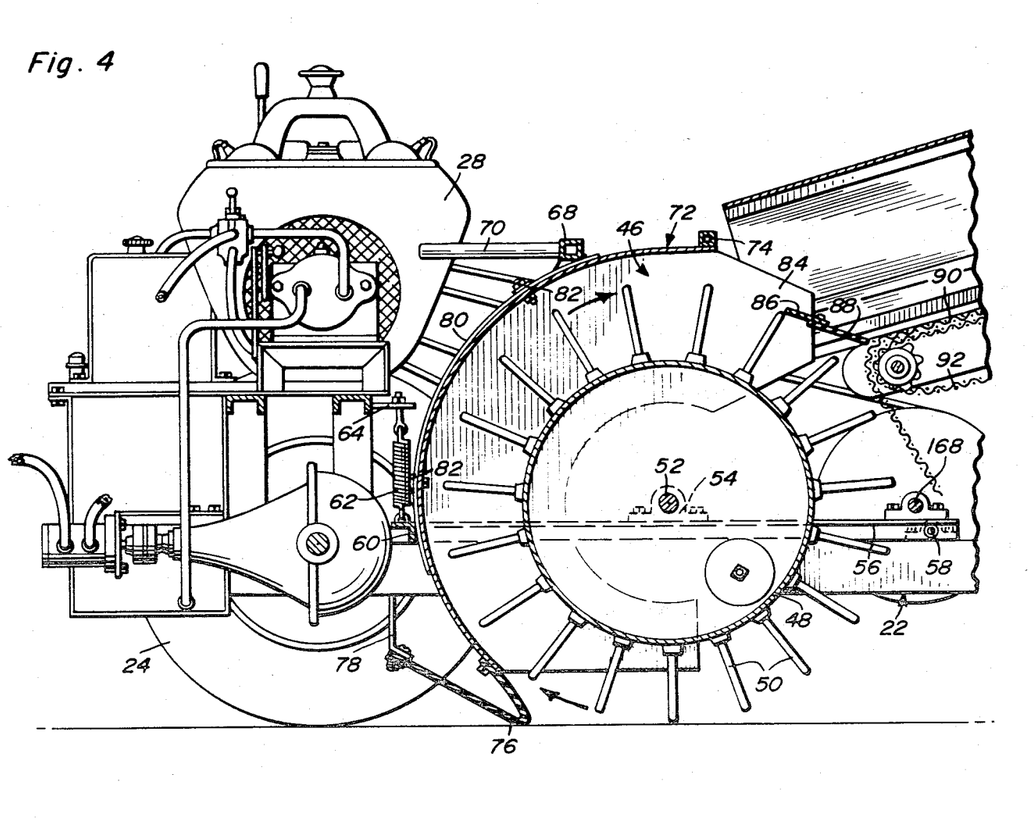
FIG. 4 is an enlarged longitudinal cross-sectional view through the forward portion of the machine.

As illustrated in the drawings, with particular reference to FIG. 4, the fingered drum 48 and the hood 72 are not concentrically arranged but instead are mounted with eccentricity between the drum and hood to provide for an increasing spaced relation between the ends of the fingers 50 and the interior surface of the hood 72 with the ends of the fingers closely adjacent the interior of the hood at the entrance at the lower end. This is important for the build-up of a desired suction for drawing the nuts up into the hood for assisting the pickup in response to the cooperation between the fingers and the hood.

In order to maintain the desired relation with the ends of the fingers turning in close proximity with the inner surface of the hood 72 at the entrance end, notwithstanding the changes in length of the fingers in response to wear, it is desirable to permit longitudinal adjustment of the drum along its horizontally disposed supporting side beams 56. For this purpose, means are provided for longitudinal adjustment of the pillow blocks 54 on side beams 56 as by means of longitudinally extending tongue and groove means interconnecting the pillow blocks with the surface of the beams with setscrew means for securing the elements in their adjusted relation. Instead, other conventional means may be employed, such as forming the beams with multiple longitudinally spaced openings for anchoring the pillow blocks to the beams by means of bolts extending through openings in the pillow blocks and selected openings through the beams with nut means to secure the through-extending portions of the connecting bolts.

Extending transversely between the upper rear ends of the side walls 84, which project rearwardly beyond the upper edge of the main portion of the hood 72, is a flat guide plate 86. This guide plate 86 is located just above the path of movement of the outer tips of the fingers 50 and in a position so as to receive the nuts therefrom for a directing of these nuts to the cleaning portion of the machine 20.

Actually, the effective width of the guiding plate 86 is extended by the provision of a slightly flexible flap 88 along the lower discharge edge thereof, this flap 88 terminating at or immediately adjacent the surface of the upper run of a nut carrying chain or open link conveyor 90 adjacent the lower end thereof, the conveyor 90, or more particularly the upper run thereof, extending upwardly and rearwardly from the pickup unit 46.

The openings in the chain conveyor or belt 90 are of a size so as to normally allow for the passage of the nuts therethrough. However, directly underlying the lower approximately one-half of the upper run of the belt 90, which incidentally extends across the full width of the machine 20, is the upper run of a second chain or open link belt 92, the openings in which are of a size so as to preclude passage of the nuts therethrough. In this manner, while gathered trash can readily fall through the two belts 90 and 92, the nuts will be retained within the upper belt openings by the upper run on the lower belt 92 until the upper limit of the lower belt 92 is reached, at which time the nuts will be allowed to freely fall through the upper portion of the upper run of the belt 90 onto a full width forwardly inclined gathering or deflector plate 94. The lower forward edge portion of the plate 94, toward which the plate 94 inclines for a sliding of the nuts therealong, is formed as an open trough 96 within which a cross auger type conveyor 98 is provided.

The eccentricity between the drum and the hood and the extension of the belts 90 and 92 from a level below the outlet from the upper end of the hood, upwardly and rearwardly to intercept the path of the material thrown rearwardly from the hood, provides for efficient separation of the fine material such as sand and dirt picked up with the nuts. Where all of the material picked up, including fines, dirt, nuts, twigs, leaves, vines, etc. are dumped from the hood onto the belts, the openings of the belts become clogged with the nuts and larger refuse such that the fines and dirt are often carried with the nuts upwardly along the belts for subsequent separation with the nuts. On the other hand, where the drum and hood are arranged to provide an increasing spaced relation between the ends of the fingers and the drum towards the outlet end, the materials processed therethrough are subjected to a type of centrifugal separation with the larger and heavier materials assuming an outer trajectory whereby they are thrown farther up the belts than the smaller and lighter sand and dirt. Thus the latter are deposited onto the belts forwardly of the larger and heavier materials whereby the fines and dirt can be allowed to fall through the initial runs of the belts without interference with the larger and heavier materials. Thus the materials deposited onto the upper runs of the belts are stratified for more efficient removal of undesirable material from the harvested nuts.

Figure 5:
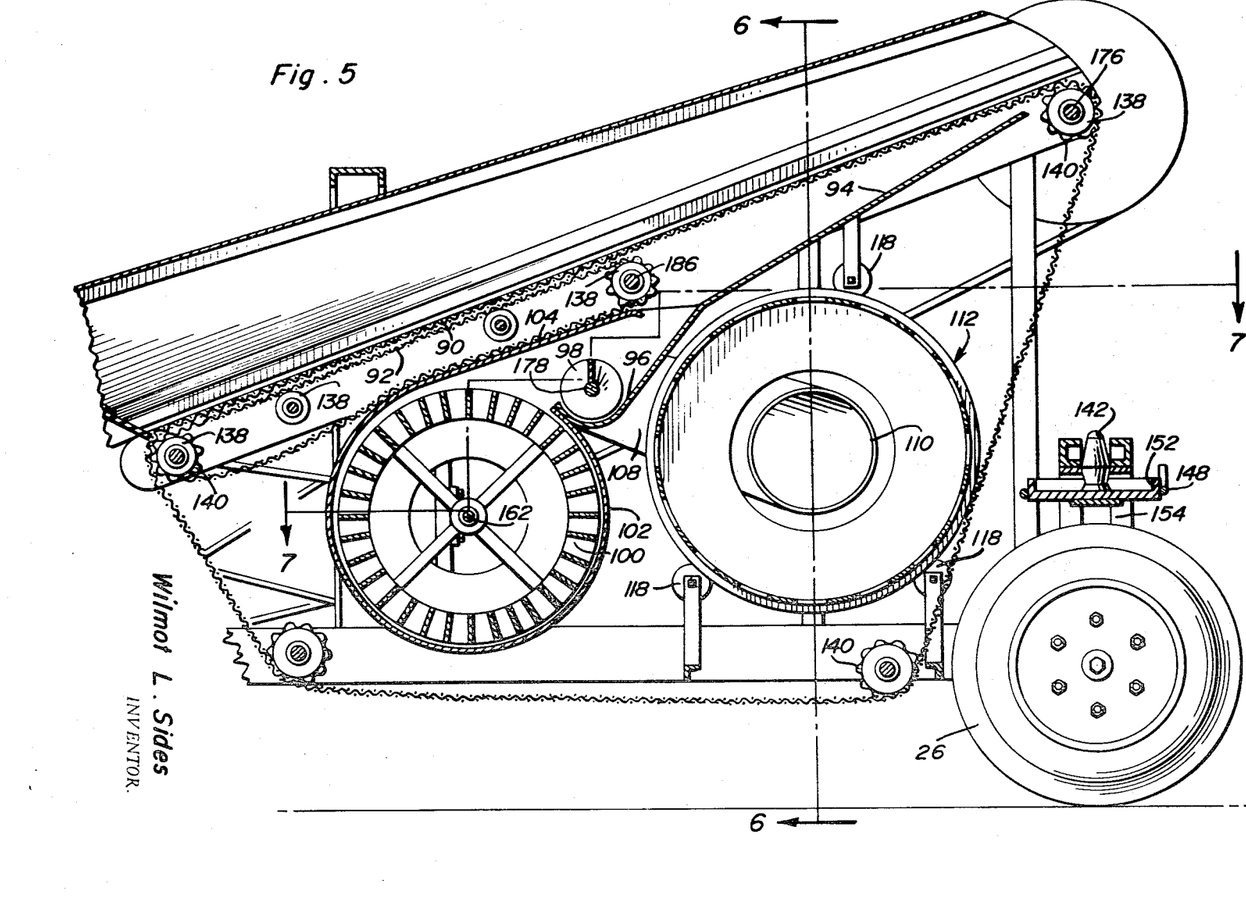
FIG. 5 is an enlarged longitudinal cross-sectional view through the rear portion of the machine.
Figures 6, 8:
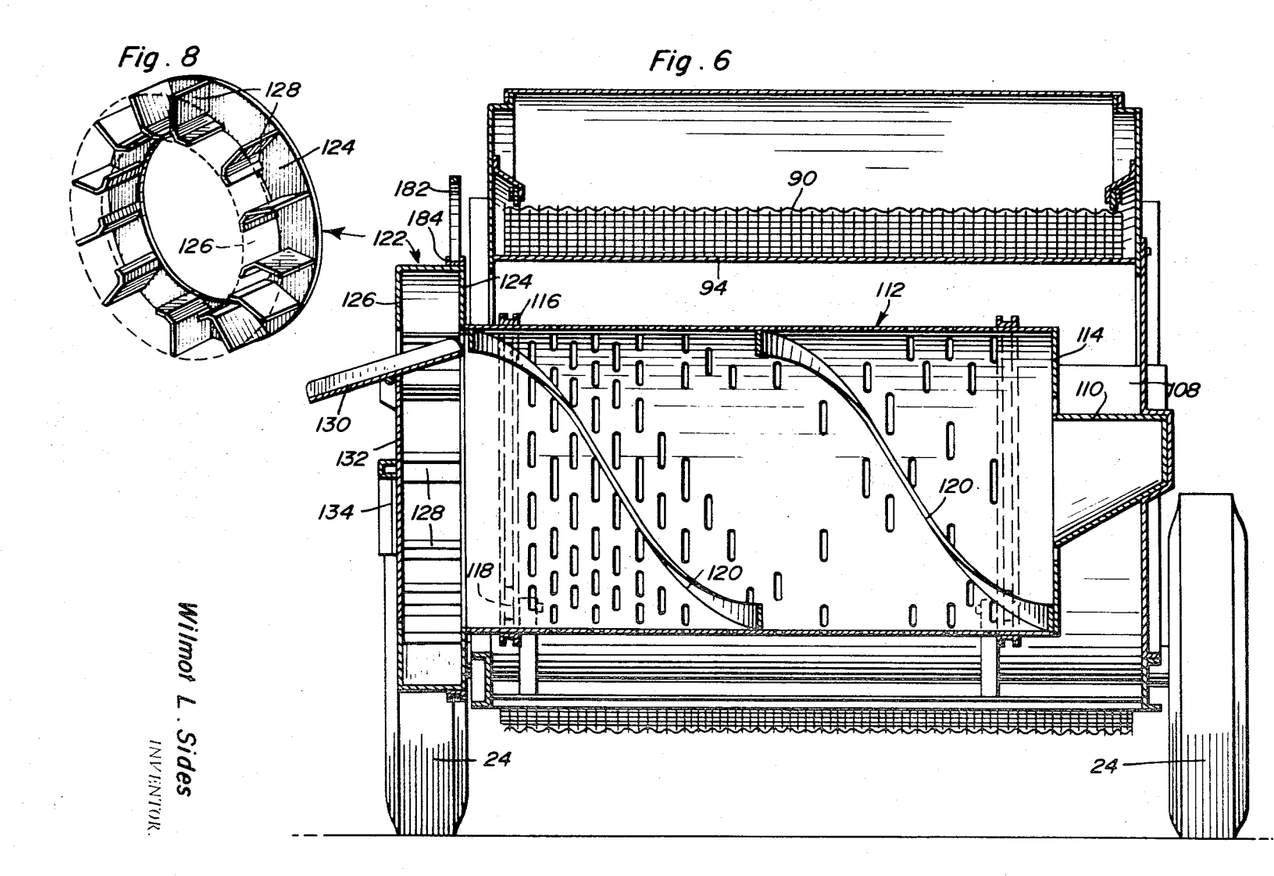
FIG. 6 is a transverse cross-sectional view taken substantially on a plane passing along line 6—6 in FIG. 5.
FIG. 8 is a perspective detail of the elevator.
Figure 7:
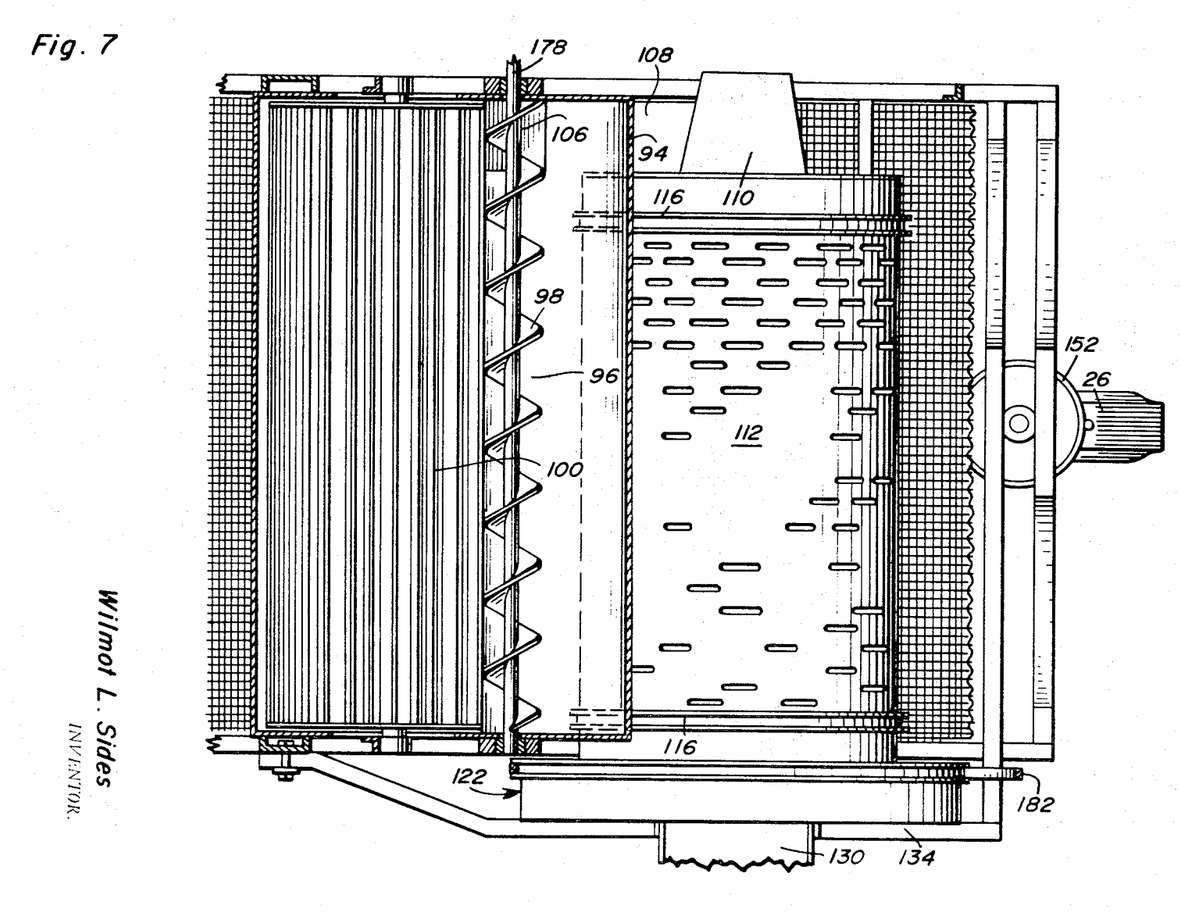
FIG. 7 is a horizontal cross-sectional view taken substantially on a plane passing along line 7—7 of FIG. 5.

Mounted transversely across the machine immediately forward of the trough 96 and below the lower run of the lower belt 92 is an enlarged blower or fan unit 100 within a cylindrical housing 102. The upper portion of the housing 102 terminates in a flat plate-like extension 104 which underlies the upper portion of the lower run of the belt 92 and extends therealong, in spaced relation above the cross auger conveyor 98, defining in effect a full width discharge spout for forced air generated by the blower unit 100. The opposite edge of the blower housing 102 terminates at approximately the lower edge of the trough 96 in spaced relation to the plate-like portion 104 so as to define the air discharging spout. The flow of forced air generated by the blower unit 100 moves over the nut deflecting plate 94 and discharges upwardly through the upper portion of the upper run of the nut discharging belt 90 so as to shift the material on the upper portion of the belt 90 and both blow a portion of the trash therefrom and facilitate a passage of the nuts therethrough. With particular reference to FIG. 5, it will be noted that the fan unit 100 and the surrounding housing 102 is positioned generally below the central portion of the lower belt 92 so as to provide for a free falling of the trash which passes through both belts immediately forward of the housing 102, the upper plate-like portion 104 of the housing 102 and the forwardly moving lower run of the belt 92 also providing a movement of the trash to a discharge point forwardly of the housing 102.

The cross auger 98 moves the nuts and remaining trash toward the left end of the trough 96, when viewed from the front of the machine, for discharge through an opening 106, the material moving downward and rearward through an inclined chute 108 and through a lateral inlet 110 into an enlarged rolling screen drum 112. The screen drum 112 extends transversely across the machine rearwardly of the fan unit 100 and below the nut deflecting and gathering plate 94. The inlet 110 is so orientated within the corresponding end wall 114 of the drum 112 as to, while freely discharging the material therein, not interfere with the rotational driving of the drum 112. The drum itself is provided with a pair of annular channel-like tracks 116 near the opposite ends thereof for the rolling reception of a plurality of support rollers 118 positioned at spaced points thereabout.

Figure 1:
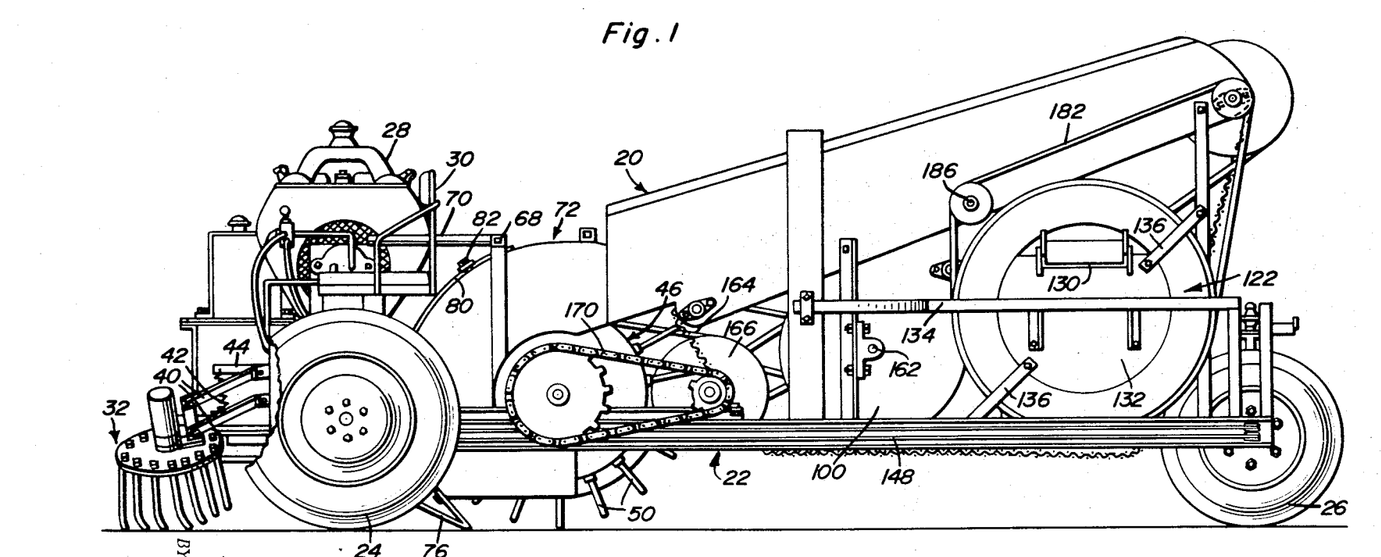
FIG. 1 is a side elevational view of the mechanical harvesting machine comprising the instant invention.
Figure 2:
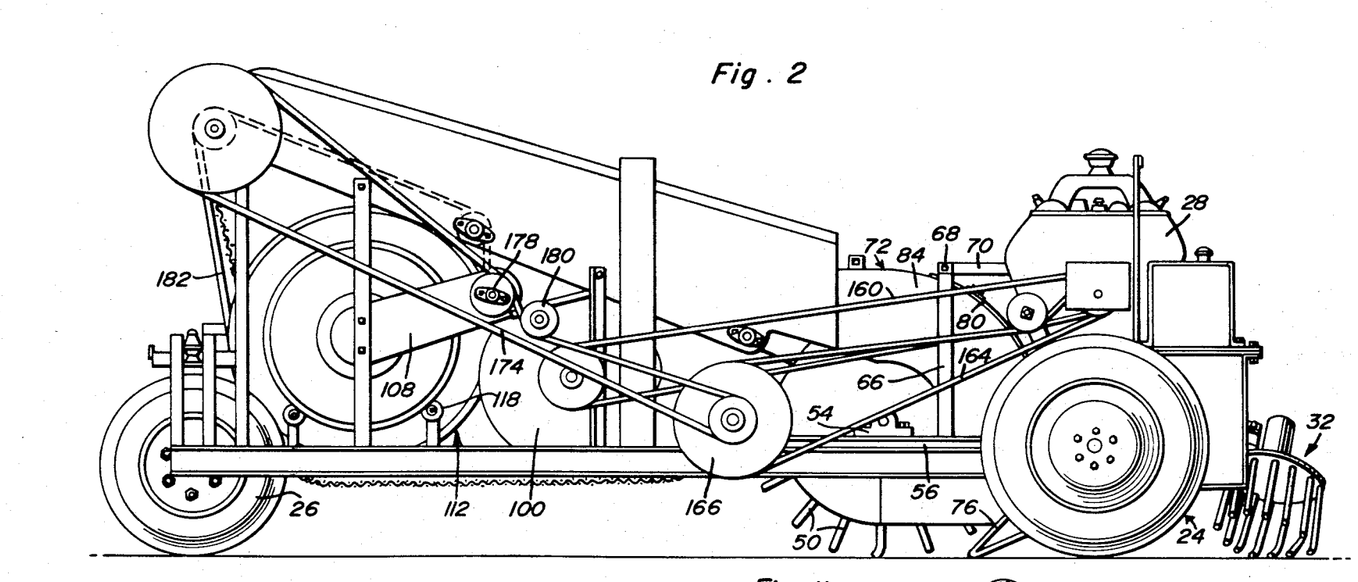
FIG. 2 is a side elevational view of the opposite side of the machine from that shown in FIG. 1.
Figure 3:
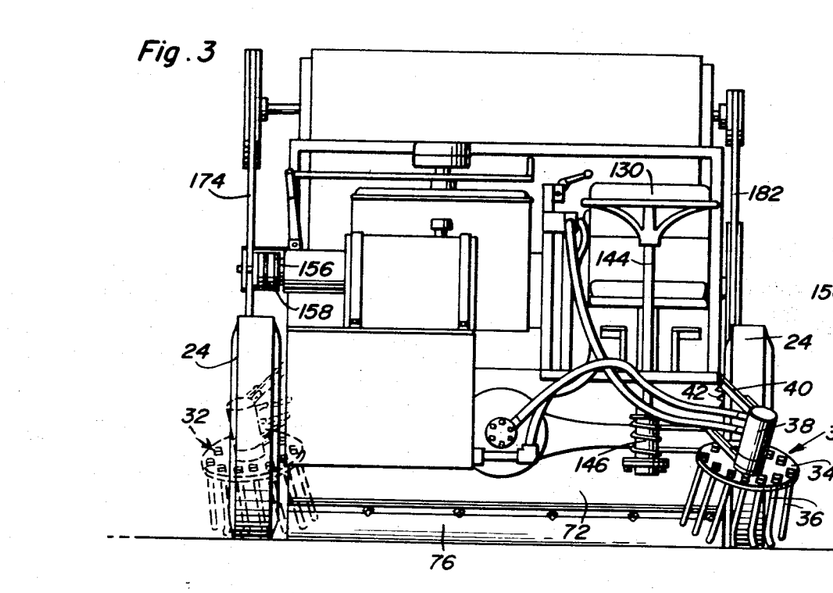
FIG. 3 is a front elevational view of the machine.

The drum 112, as previously indicated, is foraminous or apertured, and can be formed in any appropriate manner, as by the utilization of a screening material or sheet metal having a series of openings, slots, or the like therein, the purpose of the drum 112 being to effect a final tumbling cleaning of the nuts with any remaining trash being discharged through the drum openings. The drum 112 is to be horizontally orientated, as illustrated, with the material being moved therealong by one or more internal spiral flights 120 which also facilitate a tumbling of the drum received material and a more effective separation of the trash from the nuts. An enlarged circular elevator 122 is provided at the right hand discharge end of the drum 112, this end of the drum opening directly into the elevator 122 for the smooth introduction of the nuts thereto. The elevator 122 itself consists primarily of a pair of inner and outer annular side walls 124 and 126 between which radial slightly cupped fins 128 are mounted. The elevator 122 is fixed to and rotates with the drum 112 with the introduced cleaned nuts falling on the lower ones of the moving fins and being elevated to an upper position wherein the nuts slide from the fins 128 onto a downwardly and outwardly inclined discharge chute 130 for lateral movement to an appropriate collection means, for example a hopper cart traveling along adjacent to the machine 20. The discharge chute 130 is fixed to an enlarged end plate 132 received within the outer end wall 126 in a manner whereby a general sealing of this end wall is effected without interfering with the rotational operation of the elevator 122. This plate 132 can be supported, as illustrated in FIG. 1, by a frame mounted cross-beam 134 and appropriate braces 136.

Referring again to the chain belts 90 and 92, it should be appreciated that these belts, at the end of the respective runs, are supported on a series of rollers 138 and are meshed with appropriate gears 140 on common shafts with the rollers 133 whereby a positive non-slip gripping and driving of the belts 90 and 92 is achievable.

Noting FIG. 5 in particular, it will be appreciated that the outer belt 90, beyond the upwardly and rearwardly inclined upper run thereof, passes downwardly to the rear of the screening drum 112 and then forwardly beneath the screening drum 112 and fan unit 100 and subsequently upward to the forwardmost roller and gear shaft at the forward end of the upper run adjacent the transfer plate and flap 86 and 88. The extension of the lower runs of the belt 90 beneath the drum 112, as well as for that matter the belt 92, will of course not interfere with the discharge of trash due to the enlarged nature of the openings in the nut moving belt 90. Incidentally, it will be noted that the upper run of the belt 90 can be enclosed within an open ended housing so as to assist in the retention of the nuts thereon, the side walls of the housing confining and guiding the nuts throughout the travel thereof.

Figure 9:
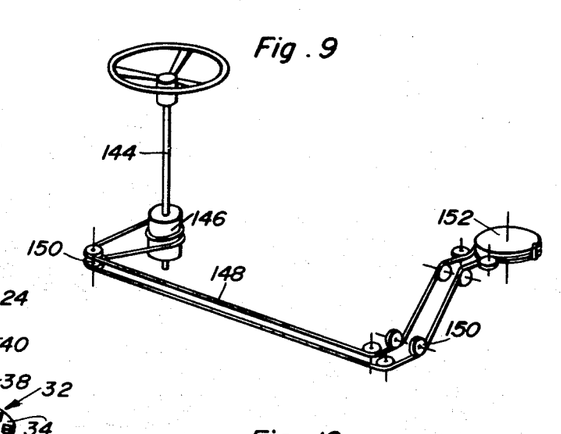
FIG. 9 is a schematic illustration of the steering means.
Figure 10:
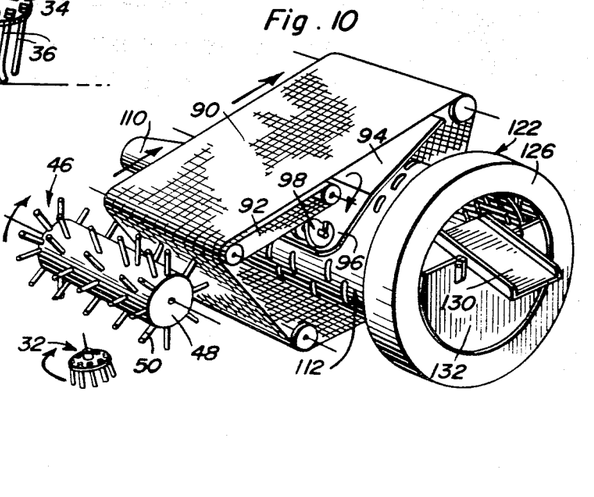
FIG. 10 is a schematic perspective of various portions of the pickup and cleaning apparatus.

As previously referred to, the steering of the apparatus is effected through a centrally located rear steering wheel 26 which is rotatably mounted through an appropriate kingpin and bearing unit 142. With reference to FIG. 9, wherein the means for controlling the steering wheel 26 has been schematically illustrated, it will be noted that the forwardly located steering handwheel and shaft 144 directly engage with a cable winding drum 146. The steering cables 148 extend from the drum about a series of pulleys 150 to a rear sheave 152 engaged with and controlling the rotation of the rear steering wheel pedestal 154.

Figure 11:
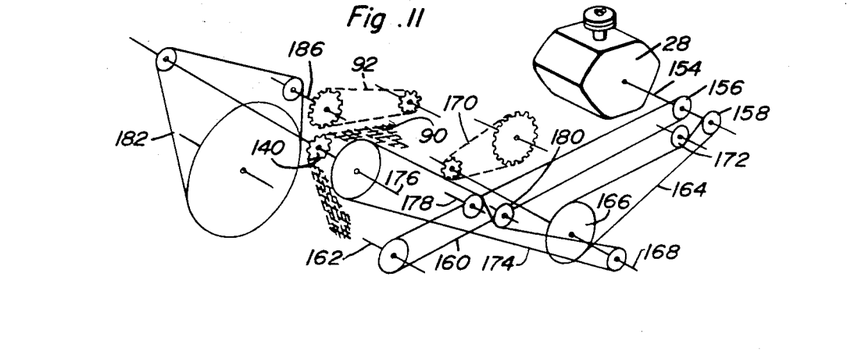
FIG. 11 is a schematic layout of the drive means associated with the various pickup and cleaning components.

With regard to the driving of the various operating components of the machine 20, attention is particularly directed to the schematic view of FIG. 11. In regard thereto, it should be appreciated that while drive belts and pulleys have been generally illustrated, drive chains and gears or sprockets can equally be utilized. As previously indicated, the power plant 28 is located at the forward end of the machine. A drive shaft 154 projects laterally therefrom and mounts a pair of pulleys 156 and 158. The pulley 156 drives through an elongated drive belt 168, the fan mounting shaft 162 appropriately mounted on the vehicle chassis. The pulley 158 drives, through a flexible belt 164 and an enlarged pulley 166, a shaft 168 rotatably mounted on the pivotally mounted beams 156, noting FIG. 4, which in turn support the pickup unit 46. The shaft 168 in turn drives, through a gear and chain drive 170, the pickup unit 46, the mounting of the shaft 168 on the pickup unit supporting frame for common movement therewith insuring the maintenance of a proper tension on the drive 170 throughout the range of adjustment of the pickup unit 46. It will be noted that an appropriate tension adjusting idler 172 is in operative engagement with the belt 164. The shaft 168 also drives, through the belt 174, both the upper shaft 176, which in turn operates the outer conveying belt 90, and the auger shaft 178, an appropriate tension maintaining idler 180 also being operatively engaged with the belt 174 so as to accommodate the movement of the shaft 168. The upper belt driving shaft 176, through the elongated belt 182, which encircles and engages within a track 184 provided about the elevator 122, drives the elevator 122 and attached screening drum 112. This belt 182 also drives the shaft 186 which controls the movement of the chain conveyor 92, thus completing a driving of all of the operating components relating to the actual picking up and cleaning of the nuts or the like.

From the foregoing, it will be appreciated that a highly unique harvester particularly adapted for the harvesting of nuts has been defined. In operation, as the machine travels over the ground, the forwardly located broom or brooms 32 sweep the nuts inwardly away from the drive wheels and into the path of the pickup unit. The pickup unit raises the nuts from the ground, along the adjustable hood, and discharges the nuts onto the upper run of the nut moving belt 90. The belt 90 moves the nuts and gathered trash over the lower belt 92 which, while allowing for a passage of the trash therethrough, retains the nuts for continued movement by the belt 90. Beyond the lower belt 92, the nuts, as well as any retained trash, are subjected to a flow of forced air which tends to separate the trash from the nuts and allow a free falling of the nuts through the belt 90 onto a gathering plate 94. The nuts slide forwardly and downwardly along the plate 94 to a trough wherein the nuts are moved laterally by an auger type conveyor for discharge into one end of a rotating screening drum 112. In the drum 112 the nuts are moved longitudinally by means of spiral flights 120 with the tumbling of the nuts resulting in a further separation of trash therefrom for discharge through the foraminous body of the drum. At the discharge end of the drum, the nuts are introduced into an elevator unit 122 which raises the nuts and drops them onto an elevated discharge chute for lateral discharge from the machine 10. While the machine is particularly adapted for the gathering of nuts, it can be used for other types of fruit. Further, through merely a change in the size of the chain belt openings, the machine can be accommodated to fruits of different sizes. The use of a second moving chain belt 92 beneath the primary belt 90 provides for a self-cleaning action during the initial cleaning stage when a major portion of the trash is being accommodated on the conveying belt 90, the upper runs of both belts run immediately adjacent and in fact in contact with each other. The floating action of both the brooms and the pickup unit contributes significantly to a complete harvesting of the nuts in that the units accommodate themselves to variations in ground conditions. As an assist thereto, the pickup unit itself can in fact be manually raised and lowered to a degree both for the accommodation of extreme ground conditions and so as to avoid possible damage thereto. It should also be appreciated that in view of the controlled rolling and tumbling of the nuts, the machine of the instant invention actually eliminates the necessity for the incorporation of a separate husking device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In a machine for harvesting small objects from off the surface of the ground having a mobile chassis, a pickup unit mounted to extend transversely of the chassis, said pickup unit being operable to raise and discharge such objects with accompanying trash from the surface of the ground for subsequent processing and comprising a drum mounted for rotational movement about an axis extending horizontally crosswise of the chassis, a plurality of fingers extending outwardly radially from the peripheral surface of the drum for engaging the objects on the surface of the ground, an arcuate hood supported by said chassis and disposed about a portion of the drum extending upwardly from adjacent the ground from an entrance end to an exit end for cooperation with the fingers for displacement of the objects from the surface of the ground from the entrance end to the exit end, and means on said chassis for rotating the drum, the improvement wherein the mobile chassis is a wheeled vehicle having laterally spaced apart supporting wheels in advance of the drum, and brooms mounted on the chassis in endwise alignment with the wheels for sweeping the objects inwardly from the path of the wheels into the path of the drum.

2. A machine as claimed in claim 1 in which the broom is mounted on the chassis for rocking movement in a vertical direction between object engaging position and raised position.

3. A machine as claimed in claim 2 in which the broom comprises horizontally disposed disc members mounted for rotational movement about a vertically disposed axis, resilient fingers extending downwardly from the lower face of the disc members for engagement to displace the objects when the discs are in object engaging position, and power means for rotating said discs.

4. A machine as claimed in claim 2 in which the means mounting the brooms for rocking movement comprises an elongate rocker arm having the brooms fixed onto the outer end portion and means on the inner end portion pivotally mounting the arms on the chassis, and spring means resiliently supporting the arms about their pivot.

5. In a machine for harvesting small objects from off the surface of the ground having a mobile chassis, a pickup unit mounted to extend transversely of the chassis, said pickup unit being operable to raise and discharge such objects with accompanying trash from the surface of the ground for subsequent processing and comprising a drum mounted for rotational movement about an axis extending horizontally crosswise of the chassis, a plurality of fingers extending outwardly radially from the peripheral surface of the drum for engaging the objects on the surface of the ground, an arcuate hood supported by said chassis and disposed about a portion of the drum extending upwardly from adjacent the ground from an entrance end to an exit end for cooperation with the fingers for displacement of the objects from the surface of the ground from the entrance end to the exit end, and means on said chassis for rotating the drum, the improvement wherein the axis of the drum is offset from the axis of the hood in the direction towards the drum whereby the spaced relationship between the ends of the fingers and the interior of the hood increases from the lower entrance end to the upper exit end.

6. A machine as claimed in claim 5 in which the axis of the drum is offset from the axis of the hood both in the direction towards the hood and below the axis of the hood.

7. A machine as claimed in claim 5 which includes means for adjustment of the axis of the drum horizontally in the direction toward and away from the hood to compensate for differences in the length of the fingers.

8. A machine as claimed in claim 5 in which the fingers extend in close proximity to the hood across the entrance end of the hood.

9. In a machine for harvesting small objects from off the surface of the ground having a mobile chassis, a pickup unit mounted to extend transversely of the chassis, said pickup unit being operable to raise and discharge such objects with accompanying trash from the surface of the ground for subsequent processing and comprising a drum mounted for rotational movement about an axis extending horizontally crosswise of the chassis, a plurality of fingers extending outwardly radially from the peripheral surface of the drum for engaging the objects on the surface of the ground, an arcuate hood supported by said chassis and disposed about a portion of the drum extending upwardly from adjacent the ground from an entrance end to an exit end for cooperation with the fingers for displacement of the objects from the surface of the ground from the entrance end to the exit end, and means on said chassis for rotating the drum, the improvement which comprises means mounting the drum for movement of the axis vertically in the direction toward and away from the ground.

10. A machine as claimed in claim 9 in which the means mounting the drum for vertical movement comprises elongate supporting arms pivotally mounted at the end portion away from the hood for rocking movement about a horizontal axis and means mounting the drum for rotational movement on an intermediate portion of the arms in the direction towards the hood.

11. A machine as claimed in claim 10 which includes means resiliently supporting the arms for rocking movement about their pivot.

12. A machine as claimed in claim 9 which includes handle means rigid with the drum for displacement thereof in the vertical direction.

13. In a machine for harvesting small objects from off the surface of the ground having a mobile chassis, a pickup unit mounted to extend transversely of the chassis, said pickup unit being operable to raise and discharge such objects with accompanying trash from the surface of the ground and comprising a drum mounted for rotational movement about an axis extending horizontally crosswise of the chassis, a plurality of fingers extending outwardly radially from the peripheral surface of the drum for engaging the objects on the surface of the ground, an arcuate hood supported by said chassis and disposed about a portion of the drum extending upwardly from adjacent the ground from an entrance end to an exit end for cooperation with the fingers for displacement of the objects from the surface of the ground from the entrance end to the exit end, and means on said chassis for rotating the drum, the improvement which comprises a conveyor separator means adjacent the upper exit end of the hood comprising a first endless foraminous member having foramens extending therethrough dimensioned to be larger than the objects to enable passage of the objects therethrough and a second endless foraminous member immediately underlying an initial portion of the first endless foraminous member and having foramens dimensioned to be smaller than the objects to prevent passage of the objects therethrough while enabling trash of smaller dimension to filter therethrough.

14. A machine as claimed in claim 13 in which the upper runs of said endless foraminous members extend angularly upwardly in the direction away from the hood from a level below the exit end of the hood to a level above the exit end of the hood whereby the endless foraminous members project across the path of the objects and trash thrown from the exit end of the hood.

15. A machine as claimed in claim 14 in which the objects and trash are subjected to centrifugal force during movement about the arcuate portion adjacent the exit end of the hood whereby elements of larger dimension and weight are displaced outwardly of elements of smaller weight and dimension whereby the latter are thrown onto the lower portion of the endless foraminous members while the former are thrown onto upper portions of the endless foraminous members to enable separation of the latter before deposition of the former onto the endless foraminous members.

16. In a machine for harvesting small objects from off the surface of the ground having a mobile chassis, a pickup unit mounted to extend transversely of the chassis, said pickup unit being operable to raise and discharge such objects with accompanying trash from the surface of the ground and comprising a drum mounted for rotational movement about an axis extending horizontally crosswise of the chassis, a plurality of fingers extending outwardly radially from the peripheral surface of the drum for engaging the objects on the surface of the ground, an arcuate hook supported by said chassis and disposed about a portion of the drum extending upwardly from adjacent the ground from an entrance end to an exit end for cooperation with the fingers for displacement of the objects from the surface of the ground from the entrance end to the exit end, and means on said chassis for rotating the drum, the improvement wherein the mobile chassis comprises a wheeled vehicle having laterally spaced apart supporting wheels in advance of the hood and brooms mounted on the chassis in endwise alignment with the wheels for sweeping the objects inwardly from the path of the wheels into the path of the drum, means mounting the drum for movement of its axis vertically in the direction toward and away from the ground, means mounting the drum eccentrically with respect to the hood to position the fingers in close proximity to the hood across the lower entrance end with increasing spaced relationship between the fingers and the hood toward the exit end, a flap formed of a flexible material connecting the lower edge portion of the hood spaced a short distance above the surface of the ground with an outwardly spaced portion of the chassis at a level above the ground with the flap being dimensioned to have a width greater than the distance between its mountings to provide a downwardly extending arcuate portion as an extension of the hood into proximity with the surface of the ground, and a conveyor separator means adjacent the upper exit portion of the hood comprising a first endless foraminous belt having openings dimensioned to enable the objects to pass therethrough and a second endless foraminous belt underlying an initial portion of the first belt and having foramens dimensioned to prevent passage of the objects therethrough while enabling trash of smaller dimension to filter therethrough, transfer means on said chassis receiving the objects from the rear portion of the first belt, a rotating foraminous drum supported by said chassis and communicating with said transfer means for receiving the material deposited from the belt onto the transfer means, and discharge means at the end of the drum for discharging the objects from the machine.

17. A machine as claimed in claim 16 which includes means for generating a stream of air and means for directing the stream of air through the portion of the first endless belt beyond the second endless belt for displacement of trash of lower specific gravity from the belt.

18. A harvesting machine for nuts and the like comprising a mobile chassis, a pickup unit mounted transversely across the forward portion of the chassis, said pickup unit being operable to raise and rearwardly discharge nuts and accompanying trash from the ground, an apertured conveyor belt on said chassis traveling rearwardly from the pickup unit and receiving the nuts and trash therefrom, retainer means below the forward portion of the belt retaining the nuts on the belt while allowing passage of the trash therethrough, the rear portion of the belt allowing passage of the nuts therethrough, transfer means on said chassis receiving the nuts from the rear portion of the belt, a rotating foraminous drum supported on said chassis and adapted to receive at one end the nuts from said foraminous means for movement therethrough and discharge means on said chassis at the second end of the drum for effecting a discharge of the nuts therefrom.

19. The machine of claim 18 wherein said transfer means comprises an enlarged inclined plate underlying the rear portion of the belt, said plate having an elongated trough at the lower edge thereof, for the gathering of the nuts therein, and an elongated conveying auger operating in said trough for the movement of the nuts to one end thereof for discharge into the first end of the rotating drum.

20. The machine of claim 19 including blower means for producing a forced flow of air upwardly through the rear portion of the belt for facilitating a separation of the trash and nuts.

21. The machine of claim 20 including means provided internally within the rotating drum for effecting a tumbling movement of the nuts and any accompanying trash therealong.

22. The machine of claim 21 wherein the discharge means at the second end of the drum includes an annular elevator incorporating a series of radial fins which receive and upwardly carry the nuts, and a discharge chute extending laterally through the upper portion of the elevator and orientated so as to receive the elevated nuts for a lateral directing thereof beyond the machine.

23. The machine of claim 22 wherein said retaining means below the forward portion of the belt comprises a second driven apertured belt traveling immediately adjacent the forward portion of the first belt and including openings therein of a size so as to preclude passage of the nuts therethrough.

24. The machine of claim 23 wherein said pickup unit comprises an enlarged drum having a plurality of flexible fingers projecting radially therefrom both longitudinally therealong and annularly thereabout for nut picking engagement with the ground.

25. The machine of claim 24 including an arcuate hood encircling the forward portion of the pickup unit in outwardly spaced relation to the outer ends of the fingers, and a ground engaging flexible flap along the lower edge of said hood, said drum rotating in a manner so as to move said fingers forwardly and upwardly along the hood for the elevating of the nuts therealong.

26. The machine of claim 25 including means adjustably mounting said hood for arcuate adjustment about said pickup unit.

27. The machine of claim 26 including means mounting said pickup unit for pivotal adjustment about a point rearwardly thereof for varying the relationship of the pickup unit to the ground, and means for effecting a pivotal adjustment relative to said chassis of the pickup unit.

28. The machine of claim 27 including laterally spaced front wheels on said chassis, and a generally vertically orientated power driven broom mounted on said chassis forward of one of said wheels, said broom being orientated so as to effect an inward sweeping of encountered nuts laterally away from the adjoining wheel and into the path of the pickup unit.

29. The machine of claim 28 wherein said broom includes a power driven forwardly and downwardly inclined disc, and a plurality of flexible fingers mounted peripherally about said disc and depending therefrom for sequential engagement with the ground upon rotation of the disc.

30. The machine of claim 29 including a single centrally located steering wheel rotatably mounted on the rear of said chassis, and means for controlling the rotation of the wheel for effecting a steering of said chassis.

31. The machine of claim 18 wherein said pickup unit comprises an enlarged drum having a plurality of flexible fingers projecting radially therefrom both longitudinally therealong and annularly thereabout for nut picking engagement with the ground.

32. The machine of claim 31 including means mounting said pickup unit for pivotal adjustment about a point rearwardly thereof for varying the relationship of the pickup unit to the ground, and means for effecting a pivotal adjustment of the pickup unit.

33. The machine of claim 18 including blower means for producing a forced flow of air upwardly through the rear portion of the belt for facilitating a separation of the trash and nuts.

34. The machine of claim 18 including means provided internally within the rotating drum for effecting a tumbling movement of the nuts and any accompanying trash therealong.

35. The machine of claim 34 wherein the discharge means at the second end of the drum includes an annular elevator incorporating a series of radial fins which receive and upwardly carry the nuts, and a discharge chute extending laterally through the upper portion of the elevator and orientated so as to receive the elevated nuts for a lateral directing thereof beyond the machine.

36. The machine of claim 18 wherein said retaining means below the forward portion of the belt comprises a second driven apertured belt traveling immediately adjacent the forward portion of the first belt and including openings therein of a size so as to preclude passage of the nuts therethrough.

37. A harvesting machine for nuts and the like comprising a mobile chassis, a pickup unit mounted transversely across the forward portion of the chassis, said pickup unit being adapted to raise and rearwardly discharge nuts and accompanying trash, an apertured conveyor belt traveling rearwardly from the pickup unit and receiving the nuts and trash therefrom, retaining means below the forward portion of the belt retaining nuts on the belt while allowing passage of trash therethrough, the rear portion of the belt allowing passage of the nuts therethrough, blower means mounted on said chassis and discharging upwardly through the rear portion of the belt for facilitating the separation of the nuts and trash, and nut gathering means below the rear portion of the belt for the reception and gathering of the nuts passing therethrough.

38. The machine of claim 37 wherein said retaining means below the forward portion of the belt comprises a second driven apertured belt traveling immediately adjacent the forward portion of the first belt and including openings therein of a size so as to preclude passage of the nuts therethrough.

39. A harvesting machine for nuts and the like comprising a mobile chassis, a pickup unit mounted transversely across the forward portion of the chassis, said pickup unit raising and rearwardly discharging nuts and accompanying trash, an apertured conveyor belt traveling rearwardly from the pickup unit and receiving the nuts and trash therefrom, retainer means below the forward portion of the belt retaining nuts on the belt while allowing passage of trash therethrough, said retaining means comprising a second driven apertured belt traveling immediately adjacent the forward portion of the first belt and including openings therein of a size so as to preclude passage of the nuts therethrough, the rear portion of the first belt allowing passage of the nuts therethrough.

References Cited

UNITED STATES PATENTS

| | | | |
|---|---|---|---|
| 2,639,573 | 5/1953 | McLaughlin | 56—328 R |
| 2,679,133 | 5/1954 | Soderholm | 56—328 R |
| 2,781,625 | 2/1957 | Phelps et al. | 56—328 R |
| 3,105,344 | 10/1963 | Anderson et al. | 56—328 R |
| 3,107,475 | 10/1963 | Gustafson | 56—328 R |
| 3,156,080 | 11/1964 | Huff | 56—28 |
| 3,182,437 | 5/1965 | Ramacher et al. | 56—328 R |
| 3,327,459 | 6/1967 | Logan | 56—28 |
| 3,387,442 | 6/1968 | Henson | 56—328 R |
| 3,530,655 | 9/1970 | Whitney et al. | 56—328 R |

FOREIGN PATENTS

| | | | |
|---|---|---|---|
| 76,698 | 10/1961 | France | 56—328 R |

RUSSELL R. KINSEY, Primary Examiner